UNITED STATES PATENT OFFICE.

WILLIAM SUNDERLAND, OF LEHI CITY, UTAH TERRITORY.

PROCESS OF MANUFACTURING ALLOY.

SPECIFICATION forming part of Letters Patent No. 544,753, dated August 20, 1895.

Application filed February 28, 1894. Serial No. 501,879. (Specimens.)

*To all whom it may concern:*

Be it known that I, WILLIAM SUNDERLAND, a citizen of the United States, residing at Lehi City, Utah county, Utah Territory, have invented a new and useful Process of Manufacturing an Alloy or Metal Compound, to be used for manufacturing purposes and in the arts, and more especially for the manufacture of all articles requiring strength and ability to resist atmospheric oxidation, and as an agent for extracting gold and silver and other precious metals from a cyanide of potassium and other chemical solutions that have been applied to ores to leach out said precious metals, and this process has never been patented in this or any other country, of which the following is a specification.

The process of manufacturing consists of melting in a furnace one-half ton of lead and one ton of zinc, and gradually mixing through the molten metal a pulverized mixture of six tons of clay or other alumina-bearing earth, and five hundred pounds of chloride of sodium. The resulting metal resists oxidation under all atmospheric conditions, is of a bright whitish-blue color, and susceptible of a very high polish.

What I do claim as my invention, and desire to secure by Letters Patent of the United States, is—

The process of manufacturing the described alloy, consisting in melting in a furnace one half ton of lead and one ton of zinc, and gradually mixing through the molten metal a pulverized mixture of six tons of clay or alumina bearing earth, and five hundred pounds of chloride of sodium as set forth.

WILLIAM SUNDERLAND.

Witnesses:
ERNEST G. ROGNON,
WM. A. GRAVES.